United States Patent Office 3,527,683
Patented Sept. 8, 1970

3,527,683
PROCESS FOR PREPARING
PYRIDOXAL-5-PHOSPHATE
Masao Tanaka and Kazuyuki Mineura, Machida-shi, Tokyo-to, Japan, assignors to Kyowa Hakko Kogyo Kabushiki Kaisha (Kyowa Hakko Kogyo Co., Ltd.), Tokyo, Japan, a corporation of Japan
No Drawing. Filed July 2, 1968, Ser. No. 741,843
Claims priority, application Japan, July 5, 1967,
42/42,802
Int. Cl. B01j 1/10
U.S. Cl. 204—158       10 Claims

ABSTRACT OF THE DISCLOSURE

Pyridoxal-5-phosphate is prepared by photo-oxidizing pyridoxine-4,5-cyclic phosphate in the presence of a photo-sensitizer. The reaction is preferably carried out in aqueous solution which is neutral to basic at a temperature of 30°–60° C. Best results are obtained when an amino compound is present, and this compound may, itself, act as a photo-sensitizer.

BACKGROUND OF THE INVENTION

The present invention relates to a process for preparing pyridoxal-5-phosphate (2-methyl-3-hydroxy-4-formyl-5-pyridylmethylphosphoric acid) the 5-monophosphoric acid ester of pyridoxal. Pyridoxal-5-phosphate is one of the biochemically active forms of the vitamin $B_6$ group and is very important as a coenzyme for various enzymatic reactions in living bodies. Therefore it has been desired to provide a commercial process for its preparation having regard to its high biochemical activity as well as to its wide uses as a medicament or as an additive to human or animal foodstuffs.

Pyridoxal-5-phosphate has conventionally been prepared, for example, by the phosphorylation of pyridoxal or its derivatives, such as e.g. its Schiff-base, or by the chemical oxidation of pyridoxine-5-phosphate or pyridoxamine-5-phosphate. However, various difficulties are observed in the practice of these processes with regard to poor yields and complicated operations due to the instability of the desired product.

The present inventors have studied the oxidation of phosphoric acid esters of pyridoxine or pyridoxamine and have made the discovery that pyridoxine phosphate can be converted into pyridoxal-5-phosphate by photo-oxidation under very mild conditions in the presence of certain photosensitizers. This reaction is carried out in a similar manner to the oxidation reaction using pyridoxine-oxygen-oxyd-reductor (i.e. Enzyme No. 1.4.3.5 or pyridoxamine oxidase). Based on this discovery, there has been developed a completely new process for preparing pyridoxal-5-phosphate and this is disclosed in pending Japanese patent applications Nos. 49,081/1966, 60,330/1966 and 64,946/1966 (U.S. application Ser. No. 656,320).

DESCRIPTION OF THE PREFERRED
EMBODIMENTS OF THE INVENTION

As a result of further studies on the reaction, it has now been found that a similar reaction to obtain pyridoxal-5-phosphate can also be applied to pyridoxine-4,5-cyclic phosphate having the formula

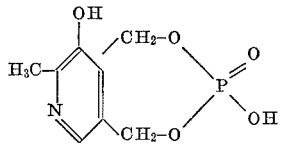

Pyridoxine-4,5-cyclic phosphate can be synthesized more easily than pyridoxine-5-phosphate according to the method disclosed by prior art publications, such as e.g. French Pat. No. 1,447,410, and it can be converted into pyridoxal-5-phosphate in better yield by the process of the present invention than by conventional processes, making it suitable for the commercial preparation of the desired product.

According to the main feature of the present invention, pyridoxal-5-phosphate is prepared by photo-oxidizing pyridoxine-4,5-cyclic phosphate under mild conditions in the presence of a compound having photo-sensitizing activity. Compounds which may be used as photo-sensitizers for the present invention include, for example, those which are capable of forming a charge-transfer complex with pyridoxine-4,5-cyclic phosphate and which participate in the electron transfer in the photo-oxidation of pyridoxine-4,5-cyclic phosphate into pyridoxal-5-phosphate. Basically, it is possible to choose a suitable compound easily because the absorption of a compound in both the ultraviolet and visible portions of the spectrum may predictably shift in the presence of various vitamin $B_6$-related substances, such as e.g. pyridoxine, pyridoxamine, pyridoxine-4,5-cyclic phosphate, etc. Since the characteristics of the various compounds are already known, it is easy to choose an effective photo-sensitizer. Among useful compounds, flavin compounds are preferred because they have strong activities and can be treated easily.

The reaction according to the invention is carried out in a suitable solvent, in which both starting material and photo-sensitizer are soluble so as to form a complex readily. Water is the preferred solvent from both technical and economic points of view. Although various processes may be employed for the oxidation, it is found that air-oxidation gives the best results. Preferably, the reaction solution is near neutral to basic having a pH of 8 to 11 and the reaction temperature is from 30° to 60° C., although a temperature of from 0° to 100° C. and a pH of 6–12 may be employed. As the light source for photo-oxidation, any suitable source of visible or ultraviolet rays can be employed. The amount of illumination is preferably within a range of 1,000–20,000 luxes.

As was the case with the photo-oxidation of phosphoric acid esters of pyridoxine and pyridoxamine, it is preferred, in order to obtain increased yields of the desired pyridoxal-5-phosphate, to carry out the process of the present invention using pyridoxine-4,5-cyclic phosphate as the starting material in the presence of an amino compound, which may be aliphatic, aromatic or heterocyclic in character. Among amino compounds which may be used for the purpose of the present invention, aromatic amines, such as e.g. aniline, amino alcohols, such as e.g. ethanolamine, propanolamine, tris-(hydroxymethyl)-aminomethane, and amino acids, such as e.g. glutamic acid, glutamine, etc., have been found to give better results.

Pyridoxal-5-phosphate can be produced in good yield using at least one of the above amino compounds in the reaction solution together with a suitable photo-sensitizer. Since a number of the amino compounds which may be used have, themselves, the required photo-sensitive activity, it is possible to produce pyridoxal-5-phosphate in the presence of such a compound, alone. The relative proportions of starting material, photo-sensitizer and amino compound in the reaction solution are not critical. However, it may be stated that good results have been obtained when the reaction solution contains 0.1–10 mg./ml. of starting material, $\frac{1}{10}$–$\frac{1}{100}$ molar ratio of photo-sensitizer based on the amount of starting material and an amino compound at a molar ratio of 1–20 based on the amount of starting material, it being recognized, as pointed out above, that certain amino compounds can also serve as a photo-sensitizer.

Pyridoxine-4,5-cyclic phosphate can be oxidized into pyridoxal-5-phosphate in a high yield under such conditions. After the completion of the reaction, the pyridoxal-5-phosphate produced can easily be recovered by a suitable purification process to give highly purified crystals. The thus obtained pyridoxal-5-phosphate corresponds exactly with a known sample of the compound with respect to its physical, chemical and biochemical properties.

The present invention is illustrated by the following examples, which are not to be construed as limiting in nature:

Example 1

An aqueous solution containing 500 µg./ml. of pyridoxine-4,5-cyclic phosphate, 7 µg./ml. of riboflavin and 1 mg./ml. of aniline and having a pH of 8.0 was stirred by air-bubbling at 30° C. under an illumination of 10,000 luxes for 10 hours to produce 121 µg./ml. of pyridoxal-5-phosphate in the solution. The determination of the product was made by the enzymatic method using apotryptophanase prepared from cells of *Escherichia coli*.

One liter of the reaction solution was passed through a column packed with 500 ml. of a strongly basic ion exchange resin [Dowex 1×8 (cl. form)]. The resin bed was well washed with water and again washed with 0.001 N hydrochloric acid in order to remove unreacted materials. Subsequently, pyridoxal-5-phosphate was eluted with 0.1 N hydrochloric acid. 250 ml. of the eluate was adjusted to pH 8.0 with caustic soda and concentrated under reduced pressure at a temperature below 40° C. to about 10 ml. Ethanol was added and the resulting mixture was allowed to stand with cooling. The pale yellowish needle-like crystals which formed were separated and dried to give 89 mg. of pyridoxal-5-phosphate.

Infrared and ultraviolet absorptions of the crystals were confirmed as being in agreement with those of a known sample, and the crystals show coenzymatic activity to apotryptophanase and biological activity to *Saccharomyces carlsbergensis*.

Example 2

An aqueous solution containing 500 µg./ml. of pyridoxine-4,5-cyclic phosphate, 5 µg./ml. of flavin-monophosphate and 1 mg./ml. of sulfanilic acid and having a pH of 10.0 was treated in a manner similar to that described in Example 1 for 10 hours to produce pyridoxal-5-phosphate in an amount of 127 µg./ml. (determined by enzymatic method). Crystals of pyridoxal-5-phosphate were separated in a similar manner to that described in Example 1.

Example 3

An aqueous solution containing 1 mg./ml. of pyridoxine-4,5-cyclic phosphate, 20 µg./ml. of 6,7,8-trimethyl-lumazine, 2 mg./ml. of aniline and 10 mg./ml. of 2-amino-2-hydroxymethyl-1,3-propanediol and having a pH of 9.0 was treated in a manner similar to that described in Example 1 for 20 hours to produce 792 µg./ml. of pyridoxal-5-phosphate which was obtained in purified crystalline form in a manner similar to that described in Example 1.

Example 4

An aqueous solution containing 500 µg./ml. of pyridoxine-4,5-cyclic phosphate, 10 µg./ml. of lumiflavin, 1 mg./ml. of aniline and 5 mg./ml. of 1-amino-2-propanol and having a pH of 8.5 was subjected to oxidation in a similar manner to that described in Example 1. After 20 hours, 345 µg./ml. of pyridoxal-5-phosphate was produced and the reaction mixture was treated to obtain highly purified crystals.

Example 5

An aqueous solution containing 5 mg./ml. of pyridoxine-4,5-cyclic phosphate, 10 mg./ml. of sulfanilic acid and 25 mg./ml. of L-glutamine and having a pH of 8.0 was treated in a manner similar to that described in Example 1. After 40 hours, 1.2 mg./ml. of pyridoxal-5-phosphate were produced.

Having described our invention, we claim:
1. A process for preparing pyridoxal-5-phosphate, comprising photo-oxidizing pyridoxine-4,5-cyclic phosphate in the presence of a photo-sensitizer.
2. A process as claimed in claim 1 in which the reaction is carried out in aqueous solution.
3. A process as claimed in claim 2 in which said aqueous reaction solution is maintained at a temperature of from 0° to 100° C. and at a pH of from 6 to 12.
4. A process as claimed in claim 3 in which said temperature is maintained within the range of 30°–60° C. and said pH within the range of 8–11.
5. A process as claimed in claim 3 in which air is bubbled through said reaction solution.
6. A process as claimed in claim 5 in which said photo-sensitizer is a flavin compound.
7. A process as claimed 6 in which an amino compound is also present in said reaction solution.
8. A process as claimed in claim 5 in which an amino compound is present in said reaction solution.
9. A process as claimed in claim 8 in which said amino compound acts as a photo-sensitizer.
10. A process as claimed in claim 5 in which the amount of illumination effecting photo-oxidation is within the range from 1,000–20,000 luxes.

References Cited

UNITED STATES PATENTS 2,599,587   6/1952   Shwartzman _____ 204—158

HOWARD S. WILLIAMS, Primary Examiner